US009223847B2

(12) United States Patent  (10) Patent No.: US 9,223,847 B2
Aski et al.  (45) Date of Patent: Dec. 29, 2015

(54) USING DIMENSION SUBSTITUTIONS IN OLAP CUBES

(75) Inventors: Vijay Aski, Bellevue, WA (US); Danny Chen, Miami, FL (US); Chris Lauren, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 62 days.

(21) Appl. No.: 13/414,242

(22) Filed: Mar. 7, 2012

(65) Prior Publication Data

US 2013/0238549 A1  Sep. 12, 2013

(51) Int. Cl.
*G06F 7/00* (2006.01)
*G06F 17/30* (2006.01)

(52) U.S. Cl.
CPC .............................. *G06F 17/30592* (2013.01)

(58) Field of Classification Search
USPC .................................... 707/607, 602, 999.104
See application file for complete search history.

(56) References Cited

U.S. PATENT DOCUMENTS

| | | | | |
|---|---|---|---|---|
| 5,991,754 | A * | 11/1999 | Raitto et al. ........................... | 1/1 |
| 6,356,900 | B1 * | 3/2002 | Egilsson et al. ....................... | 1/1 |
| 6,484,179 | B1 * | 11/2002 | Roccaforte ................... | 707/737 |
| 7,133,865 | B1 * | 11/2006 | Pedersen et al. ....................... | 1/1 |
| 7,401,321 | B2 | 7/2008 | Sit et al. | |
| 7,716,257 | B2 | 5/2010 | Thomson et al. | |
| 7,822,776 | B2 * | 10/2010 | Martin .......................... | 707/796 |
| 2006/0010159 | A1 * | 1/2006 | Mirchandani et al. ........ | 707/102 |
| 2006/0129564 | A1 * | 6/2006 | Shah et al. ...................... | 707/10 |
| 2006/0294098 | A1 * | 12/2006 | Thomson et al. .................. | 707/6 |
| 2007/0005154 | A1 * | 1/2007 | Lancaster et al. ............... | 700/49 |
| 2007/0061287 | A1 * | 3/2007 | Le et al. ............................. | 707/2 |
| 2007/0130116 | A1 * | 6/2007 | Cras et al. .......................... | 707/2 |
| 2007/0156634 | A1 * | 7/2007 | Martin ............................. | 707/1 |
| 2010/0235345 | A1 | 9/2010 | Joseph et al. | |
| 2010/0293135 | A1 * | 11/2010 | Candea et al. ................ | 707/602 |
| 2011/0125668 | A1 * | 5/2011 | Colliat et al. ................. | 705/348 |
| 2011/0231359 | A1 * | 9/2011 | Lerwich et al. ............... | 707/600 |
| 2012/0254787 | A1 * | 10/2012 | Toman .......................... | 715/777 |
| 2013/0166498 | A1 * | 6/2013 | Aski et al. ..................... | 707/602 |

OTHER PUBLICATIONS

"PeopleTools 8.12 PeopleSoft Cube Manager PeopleBook", Published on: Jan. 2011, Available at: http://docs.oracle.com/cd/B28721_01/psft/acrobat/mtcmr8sp1b1200.pdf.

(Continued)

*Primary Examiner* — Mohammed R Uddin
(74) *Attorney, Agent, or Firm* — Henry Gabryjelski; Kate Drakos; Micky Minhas

(57) ABSTRACT

Systems, methods and computer program products that provide a framework for the creation, editing, manipulation and use of model-based, multidimensional analysis services (MAS) cubes and using substitute dimensions in such cubes are disclosed. To permit a user to obtain better and automatic access to business intelligence, a method of generating a model-based MAS cube comprises creating a data source comprising a data warehouse in the memory via the processor, creating a data source view providing a dimension, a fact and an outrigger from the created data source, and creating the MAS cube comprising at least one measure group. Using substitute dimensions comprises finding all relevant substitutions for a measure group, creating a table for the measure group in the data source view, adding a property as the primary key of the substitute dimension and generating a query containing an inner join logical link between the substitute and original dimension.

19 Claims, 9 Drawing Sheets

(56) References Cited

OTHER PUBLICATIONS

Poess, et al., "Generating Thousand Benchmark Queries in Seconds", In Proceedings of the Thirtieth International Conference on Very Large Data bases, vol. 30, 2004, pp. 1045-1053.

Khalek, et al., "Automated SQL Query Generation for Systematic Testing of Database Engines", In Proceedings of IEEE/ACM International Conference on Automated Software Engineering, Sep. 20-24, 2010, pp. 329-332.

"Creating Dimensions and Cubes", Retrieved on: Dec. 28, 2011, Available at: http://docs.oracle.com/cd/E11882_01/olap.112/e17123/cubes.htm.

"Extending OLAP Cube Services in Microsoft Project Server", Retrieved on: Dec. 27, 2011, Available at: http://msdn.microsoft.com/en-us/library/aa188799(v=office.10).aspx.

* cited by examiner

```
<SystemCenterCube ID="SystemCenterWorkItemsCube">
 <MeasureGroups>
<MeasureGroup ID="IncidentAssignedToUser" Fact="DWBase!WorkItemAssignedToUserFact"
DateDimAlias="IncidentAssignedToUserDateDim" />
</MeasureGroups>
<Substitution MeasureGroupName="IncidentAssignedToUser" TargetDimension="DWBase!WorkItemDim"
ReplacementDimension="IncidentDW!IncidentDim" Relationship="WorkItem!System.WorkItemAssignedToUser"
RelationshipEndPoint="Source" />
</SystemCenterCube>
```

FIG. 5

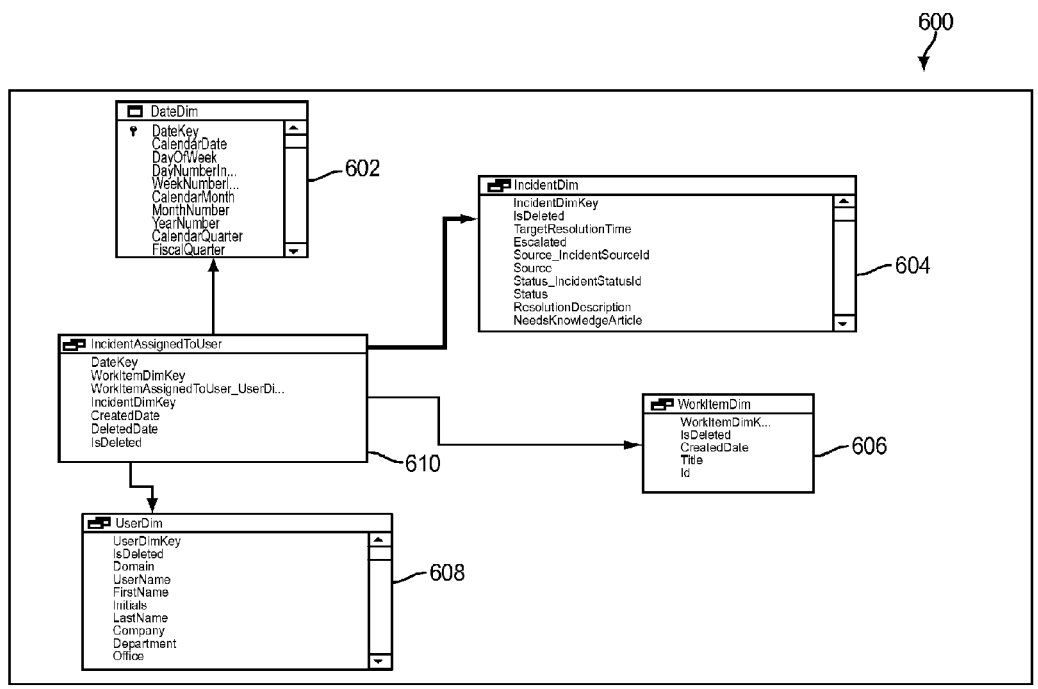

FIG. 6

```xml
<ManagementPack ContentReadable="true" SchemaVersion="2.0" xmlns:xsd="http://www.w3.org/2001/XMLSchema" xmlns:xsl="http://www.w3.org/1999/XSL/Transform">
<Manifest>
<Identity>
  <ID>ServiceManager.ConfigurationManagement.Cubes.Library</ID>
  <Version>MOM_MANAGEMENTPACK_VERSION</Version>
</Identity>
<Name>Configuration Management Cube MP</Name>
 .

Warehouse>
<Extensions>
<SystemCenterCube ID="SystemCenterWorkItemsCube">
<MeasureGroups>
 .

<Substitutions>
<!--
Substitions for SLA
-->
 .

<!--
Substitutions for Incident
-->
  <Substitution MeasureGroupName="IncidentResolutionByUser"
TargetDimension="IncidentDW!IncidentDim" AliasTargetDimensionAs="IncidentDim"
Relationship="WorkItem!System.WorkItem.TroubleTicketResolvedByUser"
RelationshipEndPoint="Source" />
 .

<Substitution MeasureGroupName="IncidentIsAboutConfigItem"
TargetDimension="DWBase!WorkItemDim" ReplacementDimension="IncidentDW!IncidentDim"
Relationship="WorkItem!System.WorkItemAboutConfigItem" RelationshipEndPoint="Source" />
  <Substitution MeasureGroupName="IncidentIsAboutConfigItem"
TargetDimension="DWBase!ConfigItemDim" AliasTargetDimensionAs="RelatedConfigItemDim"
Relationship="WorkItem!System.WorkItemAboutConfigItem" RelationshipEndPoint="Target" />
```

FIG. 10

USING DIMENSION SUBSTITUTIONS IN OLAP CUBES

CROSS REFERENCE TO RELATED APPLICATIONS

This Application is related to co-owned, co-pending U.S. patent application Ser. No. 13/337,140, titled "Model Based OLAP Cubes," filed on Dec. 25, 2011, and U.S. patent application Ser. No. 12/129,667, titled "Model Based Data Warehousing and Analytics," filed on May 29, 2008, which are hereby incorporated by reference as to their entire contents.

FIELD OF THE DISCLOSURE

The present disclosure generally relates to online analytical processing (OLAP) and more particularly to systems, methods and computer program products for facilitating the use of dimension substitutions in a model-based multidimensional analysis services cube.

BACKGROUND

In today's technological environment, knowledge workers and IT professionals commonly utilize database servers employing the online analytical processing (OLAP) approach to quickly answer multi-dimensional analytical queries. OLAP, part of the broader category of business intelligence, is typically used in business reporting applications for sales, marketing, management reporting, business process management, budgeting and forecasting, financial reporting and the like.

Many database servers and their accompanying database management systems provide developers the ability to create OLAP cubes. An OLAP cube is a data structure that allows fast analysis of data and gives users the capability of manipulating and analyzing data from multiple perspectives. This arrangement of data into cubes overcomes certain limitations of relational databases. More specifically, an OLAP cube is a multi-dimensional representation of data which is pre-aggregated and provides a semantic model. This semantic model enables end users to create reports by connecting to the cube with common desktop applications (e.g., spreadsheet, content management, document management and like applications) to create reports and dashboards by simple drag-and-drop graphical user interface (GUI) actions.

Even though OLAP cubes make creating reports and dashboards easier, most developers do not know how to create them. This is because the process of hand-crafting OLAP cubes can often be painstaking, long and expensive, requiring the services of a professional engineer with in-depth knowledge of data warehousing, dimensional modeling and OLAP concepts. To create OLAP cubes, such a professional engineer typically obtains specialized knowledge of the dimensional model specific for the particular system they are working on. Further, even after an OLAP cube is created, efforts must be expended to maintain the cube, which can include creating new partitions for measure groups, adding cube translations for localization purposes, and processing cubes when necessary to ensure that cube data does not become stale.

Underlying an OLAP cube may be a dimensional data warehouse comprising a dimension table whereby dimensions describe the data of a data warehouse. Users may browse, filter and aggregate data by manipulating dimensions. A fact table provides metrics and key performance indicators among other data of fact tables which require a dimension context in order to create actionable information. For example, a metric such as total sales has no useful context until it is given, for example, a time dimension so one may discover over time whether sales are increasing or decreasing or a store dimension which help a manager determine what stores are performing compared to their sales quotas. Thus, the detail of analysis that can be performed on a fact table is restricted by the number of dimensions which can be directly or indirectly joined to the fact table.

SUMMARY

This summary is provided to introduce a selection of concepts. These concepts are further described below in the Detailed Description. This summary is not intended to identify key features or essential features of the claimed subject matter, nor is this summary intended as an aid in determining the scope of the claimed subject matter.

The present disclosure meets the above-identified needs by providing systems, methods and computer program products that provide a framework for the creation, editing, manipulation and use of model-based multidimensional analysis services (MAS) cubes.

In an embodiment, the present disclosure provides systems, methods and computer program products that facilitate the provisioning of a framework to define model-based MAS cubes defined in Extensible Markup Language (XML) files called "management packs," which are defined by XML schema definitions. The management pack translates the XML to cube objects. In such an embodiment, MAS cubes may be built on top of a model-based data warehouse such as those described in co-owned, co-pending U.S. patent application Ser. No. 12/129,667, filed May 29, 2008 (the "'667 Application"), and U.S. patent application Ser. No. 13/337,140, filed Dec. 25, 2011 (the "'140 Application").

In an embodiment, the framework provided by the systems, methods and computer program products of the present disclosure facilitate the ability of database server users to define new MAS cubes in a manner that eliminates the complexity of defining the cubes manually. In such an embodiment, a user may use a durable framework to declare complex and extensive MAS cube definitions automatically. The new cubes are maintained automatically to be in synch with data sources when both the schema and the data impact the cubes change in the data sources. As with all management pack content, these MAS cubes can be re-used across different installations by transferring the knowledge packaged in the management pack. The embodiment provides for using dimension substitutions in the MAS cubes by a method comprising connecting to a System Center Service Manager (SCSM) computer and further connecting to a selected management pack file to enable dimension substitution.

In an embodiment, to enable dimension substitutions in the MAS cube, during deployment of the management pack file, code executing on the computer finds all relevant substitutions for an associated measure group. Then, a table is created in a data source view (DSV) for the measure group using an analysis management object (AMO) application specific interface (API). The method also comprises adding a property to the DSV which is the primary key (PK) of the substitute dimension. Then, a sequential query language (SQL) query for the table in the DSV is automatically generated containing an inner join creating a logical link between the substituted dimension and an original dimension. The properties of the substituted dimension are included in the SQL query, allowing users to filter on the properties.

In various embodiments, the framework provided by the systems, methods and computer program products of the present disclosure for creating model-based MAS cubes with dimension substitutions realizes significant benefits over hand-crafted cubes. Benefits include enriched analytical value of fact tables and a reduction in compute and resource consumption on the data warehouse. For example, in an IT service management domain, a generic workitem dimension may exist. Examples of more specific dimensions may comprise, for example, a Change Request dimension, an Incident dimension, an Activity dimension and a Problem dimension. Each of these dimensions has a primary key, but the derived dimensions may also have a foreign key targeting the primary key of the generic workitem class. By leveraging this hierarchy, an inner join may return only the desired workitems of the specific type. Not only will the inner join return only desired workitems of the specific type, but users may filter on attributes that are specific to the substituted dimension type. This allows a user to perform richer analysis based on generic fact tables. Queries may be automatically generated to filter based on what a user desires, inputs and communicates to the model. Moreover, the method enables reuse of a set of generic fact tables, thus reducing any need to create a plethora of more specific fact tables.

Further features and advantages of the present disclosure, as well as the structure and operation of various aspects of the present disclosure, are described in detail below with reference to the accompanying drawings.

BRIEF DESCRIPTION OF THE DRAWINGS

The features and advantages of the present disclosure will become more apparent from the detailed description set forth below when taken in conjunction with the drawings in which like reference numbers indicate identical or functionally similar elements.

FIG. 5 provides exemplary extensible mark-up language (XML) code demonstrating how a user may substitute a dimension according to an embodiment of the present disclosure.

FIG. 10 is an example of a Configuration Management Cube Management Pack (MP) file according to an embodiment of the present disclosure.

DETAILED DESCRIPTION

The present disclosure is directed to systems, methods and computer program products that provide a framework for the automatic creation, editing, manipulation and use of model-based multidimensional analysis services (MAS) cubes, including using dimension substitutions in such model-based MAS cubes.

In an embodiment, the present disclosure provides systems, methods and computer program products that facilitate the ability to model an MAS cube in extensible mark-up language (XML) conforming to a simplified model defined in an XML schema definition (XSD). The cube may be automatically deployed to a database management system (e.g., the Microsoft SQL Server® Analysis Services database available from Microsoft Corporation of Redmond, Wash.) with all supporting elements (e.g., data sources, a data warehouse, data source views (DSVs), facts, dimensions, outriggers, key performance indicators (KPIs), drill through actions, etc.) as described in '140 Application.

In an embodiment, the present disclosure provides systems, methods and computer program products that facilitate the ability to automatically maintain an MAS cube with no user intervention. Both schema and data of data sources impacting a change to a cube synchronously and automatically update the cube with the change schema and data. This includes partitioning the measure groups within the cube, adding cube translations for localization, and intelligent processing where only the partitions that have stale data are processed so the cube is fully up to date, and grooming of the data.

In an embodiment, the present disclosure provides systems, methods and computer program products that facilitate the customization of a cube after it has been deployed using substitute dimensions for original dimensions. As will be discussed further with reference to FIG. 2, during deployment of the management pack file, code of the computer finds all relevant substitutions for an associated measure group. Then, a table is created in a data source view (DSV) for the measure group using an analysis management object (AMO) application specific interface (API). The method also comprises adding a property to the DSV which is the primary key (PK) of the substitute dimension. Then, a sequential query language (SQL) query for the table in the DSV is automatically generated containing an inner join creating a logical link between the substituted dimension and an original dimension.

In an embodiment, the present disclosure provides systems, methods and computer program products that facilitate the ability to carry forward both the MAS cube and any customizations from one environment to another and also from one customer or independent software vendor to several other customers.

Figure 1:
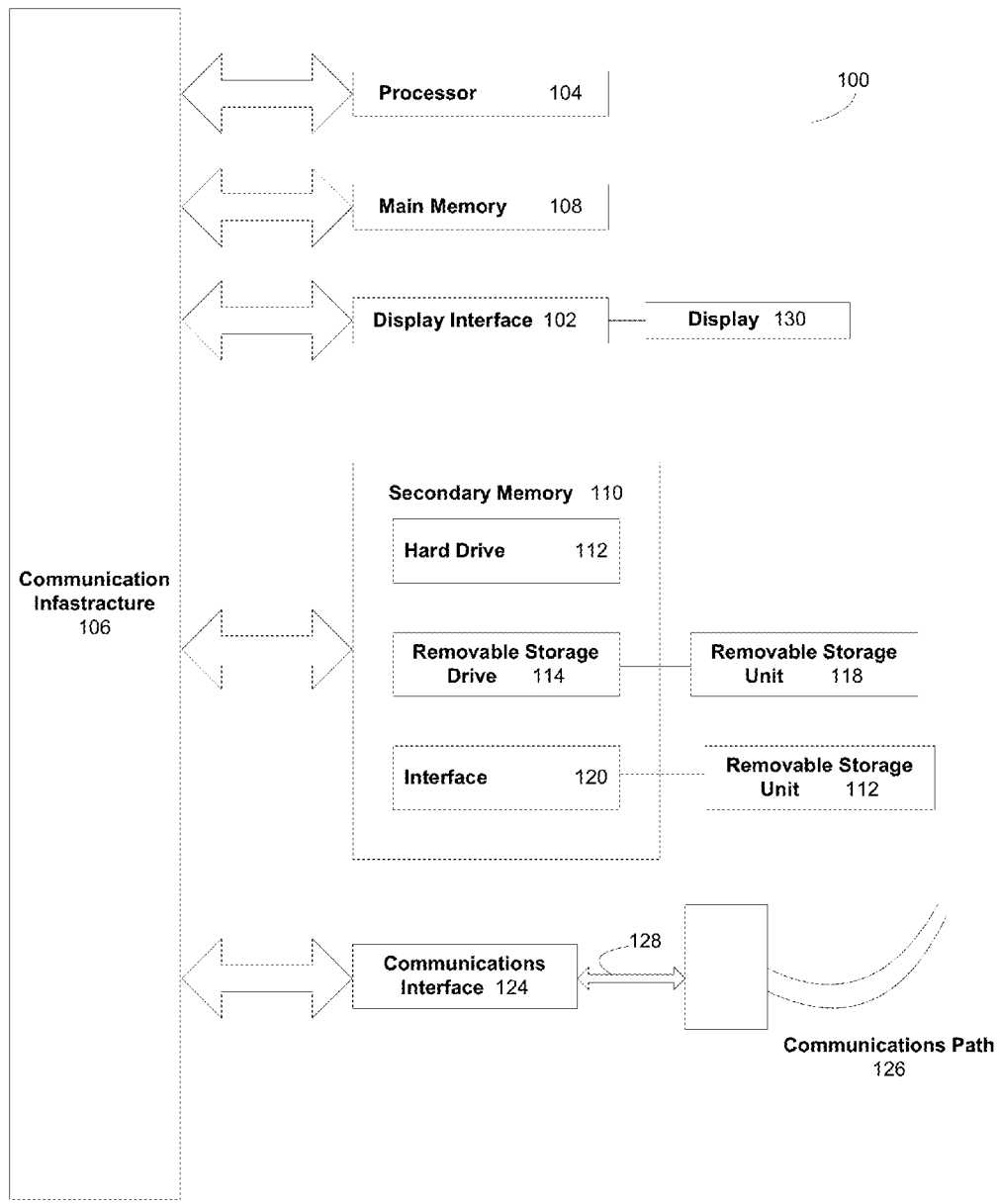
FIG. 1 is a block diagram of an exemplary computer system useful for implementing embodiments of the present disclosure.

In one embodiment, the disclosure is directed toward one or more computer systems capable of carrying out the functionality described herein having associated databases. An example of a computer system 100 is shown in FIG. 1.

Computer system 100 includes one or more processors, such as processor 104. The processor 104 is connected to a communication infrastructure 106 (e.g., a communications bus or network). Various software aspects directed to MAS cubes and dimensions substitutions are described in terms of this exemplary computer system. After reading this description, it will become apparent to a person skilled in the relevant art(s) how to implement the disclosure using other computer systems and/or architectures.

Users at workstations (not shown) communicate with computer system 100 by means of communications infrastructure 106 or other interface known in the art. A typical workstation computer used by a system user may have a similar structure to computer system 100, the difference being that computer system 100 may comprise what is referred to herein as a system manager having one or more of an OLTP system databases 302, 304, 306; data warehouse 310; data marts 312, 314; or associated MAS cubes 320, 322 as per the topology of FIG. 3B. A workstation, on the other hand, provides a user with access to any of these for creating new cubes or doing any of the creation of key performance indicators, drillthrough actions, named calculations, custom measure creation and the like. Moreover, dimensions substitutions in a business intelligence development studio will be discussed.

Computer system 100 can include a display interface 102 that forwards graphics, text and other data from the communication infrastructure 106 (or from a frame buffer not shown) for display on the display unit 130. A display may provide a dashboard or a scorecard for, for example, key performance indicators or other measures or custom measures.

Computer system 100 also includes a main memory 108, preferably random access memory (RAM) and may also include a secondary memory 110. The secondary memory 110 may include, for example, a hard disk drive 112 and/or a removable storage drive 114, representing a floppy disk drive, a magnetic tape drive, an optical disk drive, etc. The removable storage drive 114 reads from and/or writes to a removable storage unit 118 in a well-known manner. Removable storage unit 118 represents a floppy disk, magnetic tape, optical disk, etc. which is read by and written to by removable storage drive 114. As will be appreciated, the removable storage unit 118 includes a computer usable storage medium having stored therein computer software and/or data.

In alternative aspects, secondary memory 110 may include other similar devices for allowing computer programs or other code or instructions to be loaded into computer system 100. Such devices may include, for example, a removable storage unit 122 and an interface 120. Examples of such may include a program cartridge and cartridge interface (such as that found in video game devices), a removable memory chip (such as an erasable programmable read only memory (EPROM), or programmable read only memory (PROM)) and associated socket and other removable storage units 122 and interfaces 120, which allow software and data to be transferred from the removable storage unit 122 to computer system 100.

Computer system 100 may also include a communications interface 124. Communications interface 124 allows software and data to be transferred between computer system 100 and external devices. Examples of communications interface 124 may include a modem, a network interface (such as an Ethernet card), a communications port, a Personal Computer Memory Card International Association (PCMCIA) slot and card, etc. Software and data transferred via communications interface 124 are in the form of non-transitory signals 128 which may be electronic, electromagnetic, optical or other signals capable of being received by communications interface 124. These signals 128 are provided to communications interface 124 via a communications path (e.g., channel) 126. This channel 126 carries signals 128 and may be implemented using wire or cable, fiber optics, a telephone line, a cellular link, an radio frequency (RF) link and other communications channels.

In this document, the terms "computer program medium" and "computer usable medium" are used to generally refer to media such as removable storage drive 114, a hard disk installed in hard disk drive 112 and signals 128. These computer program products provide software to computer system 100. The disclosure is directed to such computer program products.

Computer programs (also referred to as computer control logic) are stored in main memory 108 and/or secondary memory 110. Computer programs may also be received via communications interface 124. Such computer programs, when executed, enable the computer system 100 to perform the features of the present disclosure, as discussed herein. In particular, the computer programs, when executed, enable the processor 104 to perform the features of the present disclosure. Accordingly, such computer programs represent controllers of the computer system 100.

In an embodiment where the disclosure is implemented using software, the software may be stored in a computer program product and loaded into computer system 100 using removable storage drive 114, hard drive 112 or communications interface 124. The control logic (software), when executed by the processor 104, causes the processor 104 to perform the functions of the disclosure as described herein.

In another embodiment, the disclosure is implemented primarily in hardware using, for example, hardware components such as application specific integrated circuits (ASICs). Implementation of the hardware state machine so as to perform the functions described herein will be apparent to persons skilled in the relevant art(s).

As will be apparent to one skilled in the relevant art(s) after reading the description herein, the computer architecture shown in FIG. 1 may be configured as any number of computing devices such as a system manager, a work station, a game console, a portable media player, a desktop, a laptop, a server, a tablet computer, a PDA, a mobile computer, a smart telephone, a mobile telephone, an intelligent communications device or the like.

In yet another embodiment, the disclosure is implemented using a combination of both hardware and software.

Now, an environment will be described wherein a method of creating and utilizing a model-based MAS cube, and implemented on a computer system 100, will be briefly described and terms defined as used in the specification and claims. Such an exemplary environment may include a data warehouse which includes one or a plurality of data sources among other entities. Model-based data warehousing and associated analytics are described in the '667 Application, and FIG. 4 thereof shows how dimensions may be associated with facts and so provide a means for useful analysis of the facts. The various entities such as data sources and one or more data warehouses 310 (shown in FIG. 3 herein) may be located relatively close together or distributed around the world and connected together by one or more networks including inter- and intra-office networks. A given data warehouse 310 may include a data source or store, capable of storing data in a structured format and comprise any storage media capable of storing data.

Data stored in a data warehouse 310 may be organized in tables, records, objects, other data structures and the like. Data warehouse 310 may comprise a relational database, an object-oriented database, a hierarchical database, any other known type of database, or any combination of these. An exemplary data warehouse 310 involves associating schema including a fact, typically a plurality of dimensions and outriggers. A fact is something known as having demonstrable existence or is objectively real. Examples of facts may be, in a business sense, the existence of a purchase order having a given date, a quantity of described goods or services and the like. Other examples of facts may readily come to mind. A fact associates dimensions. A fact may be used to create a fact table with rows associating corresponding rows of dimension tables. As an example, a row of a fact table may include keys of a salesperson, a store, a customer and a product or a service.

An outrigger associates properties of one or more types associated with dimensions. For example, one type may include computer information where computers may be manufactured by different manufacturers. Another type may be printer information. Instead of storing manufacturers of computers in dimension tables, a manufacturer identifier may be stored in a dimension table. The manufacturer identifier may be stored in an outrigger table and, as a tuple, stored with the manufacturer name.

An Online Analytical Processing (OLAP) cube 320, 322, is a data structure that overcomes limitations of relational and other types of databases by providing rapid analysis of data. Cubes can display and sum up large amounts of data of associated data marts 312, 314 while also providing users queryable access to the most granular of data so it can be rolled up, sliced, and diced as needed to handle the widest variety of questions germane to a user's domain of interest.

As discussed further herein, once OLAP cubes 320, 322, hereinafter, model-based, multidimensional analysis services (MAS) cubes have been built and populated in an analysis services system, users of tools such as Business Intelligence Development Studio (BIDS), Microsoft Excel® spreadsheets, Analysis Service's Cube Browser (available from Microsoft Corporation of Redmond, Wash.) and the like can query and view the cube data. In an embodiment of the present disclosure, an Analysis Management Objects (AMO) application programming interface (API) is provided with a server product (e.g., System Center Service Manager 2012 ("SCSM 2012"), available from Microsoft Corporation of Redmond, Wash.). This API programmatically translates elements defined in XML to its counterpart class in the AMO API. The AMO API computationally and automatically implements changes to the cubes, metadata inherent in a model and the model serving as a framework for building or changing cubes. The '140 Application discloses a framework for the creation, editing, manipulation and use of model-based, multidimensional analysis services (MAS) cubes. In such an embodiment, there are four defined elements: data sources, Data Source View, dimensions and MAS cubes. Each is briefly discussed below.

Data Sources, as defined above, are created on setup, along with user roles which are configured to have the appropriate access to the data source and analysis system databases (AS-DB's). The data source may be considered an existing data mart 312, 314 or data store with facts and dimensions, as defined above, from SCSM data warehouse 310.

The Data Source View (DSV) is a collection of views representing the dimensions, facts, and outriggers from the data source. The DSV may contain all primary and foreign key relationships between tables. When interpreting a Management Pack created MAS Cube 320, 322, a model automatically determines all primary keys (PK) and foreign keys (FK) for the end user "under the hood." For example, a user will always know which dimensions are targeted by a fact, which frees the user from having to provide that information or even be aware of it. The DSV provides a layer of abstraction on top of a relational or other database. The DSV is automatically generated and updated when each management pack is processed and its contents are deployed and mapped onto the Analysis Services (AS) database. The management pack translates extensible markup language (XML) to cube objects.

A model-based data warehouse 310 in SCSM 2012 leverages the relationship between dimensions and facts and the hierarchal relationship between related dimensions to programmatically generate the SQL queries and the cube framework that enables dimension substitution. Every dimension in SCSM 2012 targets a specific type or class which contains a list of attributes. Classes in SCSM 2012 may have a single rooted class hierarchy analogous to a type system found in Java or C# programming languages. The root element in this hierarchy may be referred to as System.Entity. The hierarchy is also important to the design of an SCSM data warehouse 310, because the traversal of this hierarchy inherently provides the metadata to determine relationships and derivations in a dimensional model.

Figure 4:
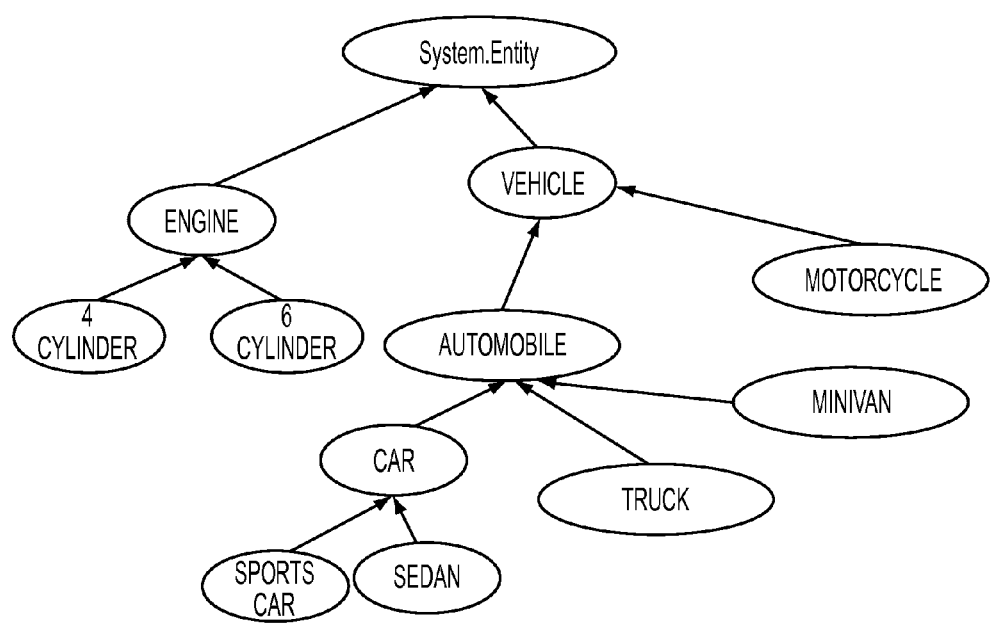
FIG. 4 is an exemplary list of sample types according to an embodiment of the present disclosure.

Referring now to FIG. 4, there is shown an example including a System.Entity root element and a list of sample types that all derive from the base type System.Entity in an exemplary SCSM configuration management database (CMDB) and data warehouse 310. In this example, for each sample type, there may be a corresponding dimension that targets sample data in data warehouse 310. In this model, there may be a single factless fact, referred to herein as a relationship fact, for example, VehicleHasEngine that targets the abstract dimensions Vehicle and Engine of FIG. 4. In and of itself, this particular fact VehicleHasEngine only provides high level information because the dimensions are generic.

Looking at the type hierarchy, however, there are potential benefits of dimension substitution for a generic dimension that may come into focus. Using a single relationship fact, for example, a user can potentially substitute seven dimensions for Vehicle and two dimensions for Engine, thereby creating a total of fourteen possible combinations (e.g., a four cylinder sedan or a six cylinder sedan). All this data may be filtered out of one fact table, as compared to instantiating fourteen fact tables if a hierarchal based type and dimension model were not employed. In addition, each dimension will have its own specific set of attributes allowing a finer granularity of user control when browsing the cubes.

For example, the fact MinivanHasEngine may use MinivanDim as a substituted dimension versus another substituted fact such as SportCarHasEngine (and associated SportCarDim). SportCarDim may obtain filterable properties such as RacingStripeColor that would not necessarily be found in MinivanDim. Conversely, MinivanDim may also contain a set of unique properties (e.g., soccerMomPopularityRating or numSlidingDoors) unique to itself and not found in any other dimension. Unless these dimensions are substituted for a generic VehicleDim, higher in the hierarchy, one would not be able to take advantage of these specific attributes when browsing a related cube.

Referring to FIG. 5, there is shown XML demonstrating how a user may define a cube via a defined model and substitute a dimension according to an embodiment of the present disclosure. For example, the user desires to capture that knowledge using a custom XML/XSD based language specific to SCSM 2012 that may be packaged inside the management pack file. In the depicted example, Incident Dimension is substituted for the more generic WorkItem Dimension for the fact WorkItemAssignedtoUserFact. An example of a resulting measure group targeting this fact may be called IncidentAssignedtoUser. The target dimension is DWBase!WorkItemDim and ReplacementDimension="IncidentDW!IncidentDim."

Figure 2:
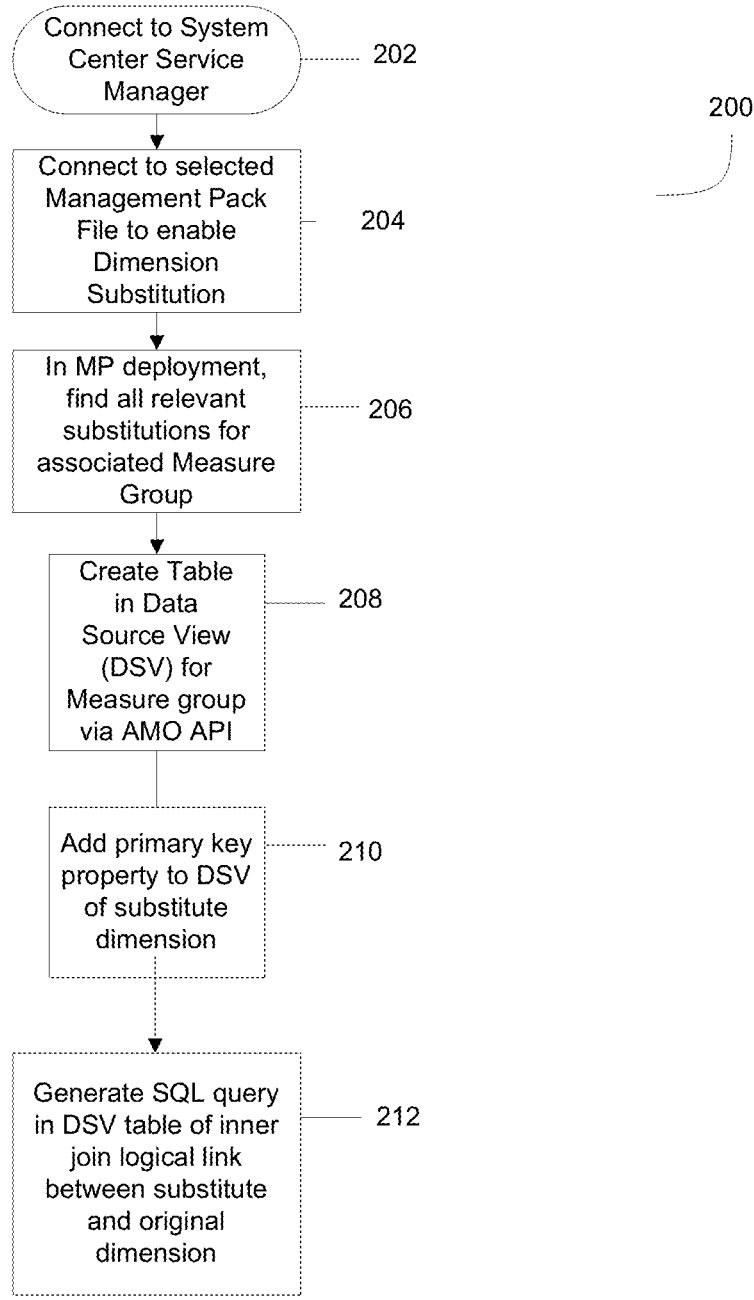
FIG. 2 is an exemplary flow chart diagram illustrating a method of enabling dimension substitutions in a model-based multidimensional analysis services (MAS) cube according to an embodiment of the present disclosure.

Referring now to FIG. 2, a flowchart illustrating an enabling dimension substitutions method 200, according to an embodiment, is shown. A user may connect to a System Center Service Manager (SCSM) 2012 available from Microsoft Corporation, Redmond, Wash. at step 202. The user may then be connected to a management pack (MP) file to enable dimension substitution at step 204 via a user interface. (Referring briefly to FIG. 3B, data sources are pervasive in an enterprise and are utilized for creation and updating data warehouse 310.) The user then obtains from their workstation a list of measure groups from a Management Pack Cube element at step 204. A measure group, by way of example, is a data element group having a measurable parameter such as date or price. First, during deployment of the management pack, all relevant substitutions for an associated measure group are found at step 206. At step 208, a table is created in a data source view (DSV) for the measure group via an analysis management object (AMO) application programming interface (API). At step 210, a primary key property is added to the view which is the primary key of the substitute dimension. At step 212, a SQL query is generated for the table in the DSV which contains an inner join creating a logical link between the substituted dimension and the original dimension.

Figure 3A:
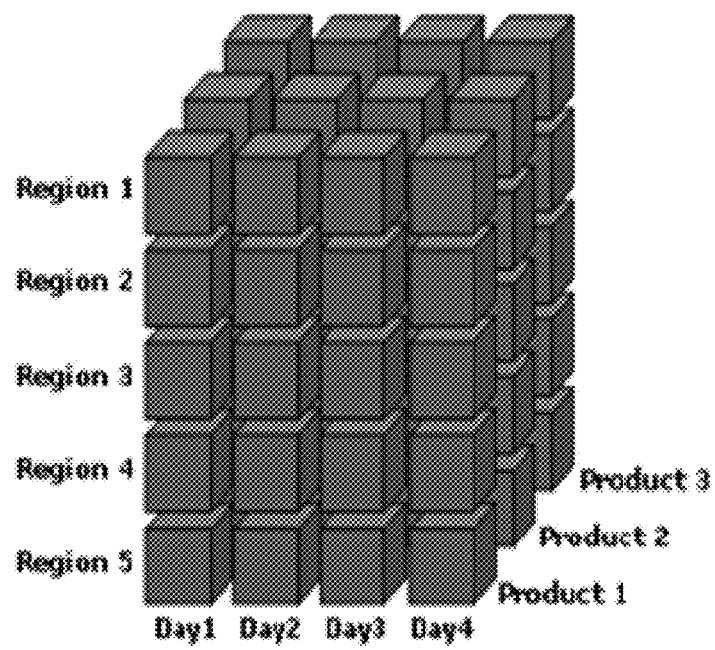
FIG. 3 is an exemplary topology of a system center service manager topology according to an embodiment of the present disclosure.

In an embodiment, each dimension in the ASDB references a dimension or outrigger from data warehouse 310. A dimension is roughly analogous to a management pack class and has a list of attributes which can be used to filter and group data in the MAS cube. A class is illustrated in FIG. 3A for a cube that contains, by way of example, Date, Region, and Product Dimensions. These are merely exemplary and more or fewer and different dimensions may be appropriate for a data cube class.

Figure 3B:
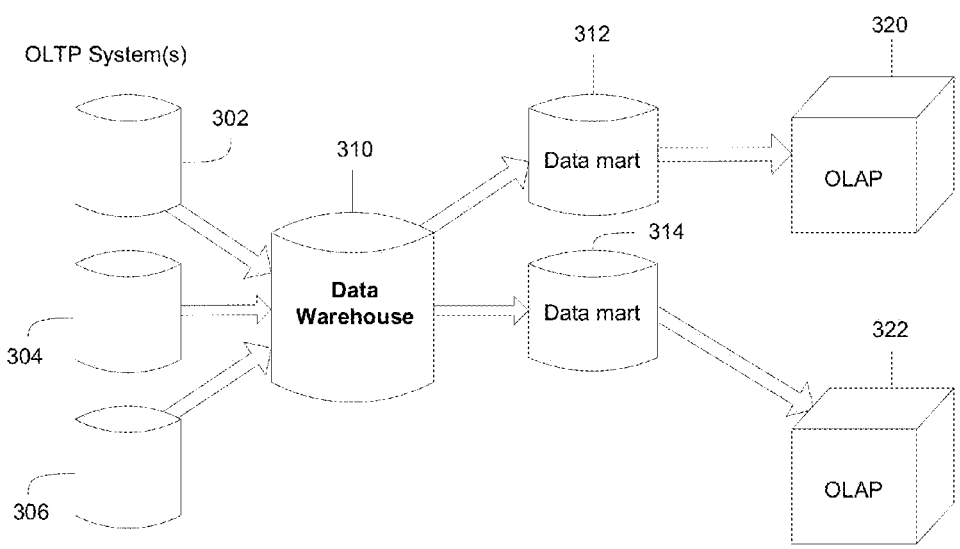

Referring to FIG. 3B, a topology of a server product (such as SCSM 2012) is shown comprising a data warehouse (DW) 310 with MAS cubes 320, 322. MAS cubes 320, 322 can be considered a final piece of a puzzle for a data warehousing solution. In an embodiment, online transaction processing (OLTP) systems 302, 304 and 306—via user workstations—access DW 310 for development of data marts 312 and 314 of associated MAS cubes 320, 322.

In an embodiment, each dimension is also automatically created during the deployment of the management pack to the ASDB. Because DW 310 is model-based, a user can automatically determine without any user input all the attributes of the dimension in DW 310 and create a corresponding dimension in the ASDB. As one can see in the cube model, there actually is no element to define the dimensions for a cube. That is because which dimensions to include for a cube based on the facts that the cube is targeting via the included measure groups can automatically be derived. The burden is lifted off of the end user to retain this specific knowledge. An advanced user, however, may be able to define "role playing dimensions" in a cube that derive from the main AS Dimension. The substitution element in the management pack (MP) allows users to define these role playing dimensions as well as substitute a new dimension for an original dimension targeted by a fact if allowed. In any multi-dimensional model, the same database dimension may play multiple roles. For example, a time dimension (FIG. 3A) can be used twice for a measure group containing flight data. One would be named "Departure Time" and the other would be "Arrival Time" on the same or different days depending on the length of the flight. Although based on the same dimension, they play and describe different roles for that measure group and can be used to filter accordingly.

Referring again to FIG. 2, method 200 will be described in greater detail and include a description of what is accomplished at each step.

Referring to step 204, in the management pack, the user defines each of the measure groups they want to include in the cube. Each measure group, for example, maps to a specific fact in DW 310. When creating the measure group in the ASDB, a user includes a count of members of the measure group as a default measure for that measure group. Additional measures may be added. For example, each of the custom facts in a server product such as SCSM 2012 may define at least one or more measures, and these measures will automatically be added to the measure group in the Cube. Each measure group also contains a list of partitions, which hold the actual data in separate non-overlapping sections. A DW maintenance background workflow will automatically manage partitions for the cube to match up with the fact partitions defined in the data mart 312, 314.

Deploying a cube management pack into a data warehouse 310 effectively means creating a MAS cube and all its supporting objects of the analysis services database (ASDB). In the example discussed above with reference to FIG. 5, there is a measure group named "IncidentAssignedtoUser" as shown in Table 1.

TABLE 1

<MeasureGroup ID="IncidentAssignedToUser" Fact=
"DWBase!WorkItemAssignedToUserFact"
DateDimAlias="IncidentAssignedToUserDateDim" />

When deploying the management pack (a portion of a management pack is provided in FIG. 10), in an embodiment, all the substitutions are traversed that are included in the MAS cube to find the ones that are targeting "IncidentAssignedToUser" by examining their "MeasureGroupNameAttribute" as shown in Table 2.

TABLE 2

<Substitution MeasureGroupName="IncidentAssignedToUser"
TargetDimension="DWBase!WorkItemDim"
ReplacementDimension="IncidentDW!IncidentDim"
Relationship="WorkItem!System.WorkItemAssignedToUser"
RelationshipEndPoint="Source" />

In this specific example, there is one substitution where the cube developer desires to substitute WorkItemDim with the more specific IncidentDim. WorkitemDim in this case is an abstract dimension and IncidentDim is a more concrete dimension. In a model-based DW as constructed per the '667 Application, each dimension targets a class. In this case, WorkItemDim targets the abstract class System.WorkItem while IncidentDim targets a concrete derived class from System.Workitem, System.WorkItem.Incident. Because these dimensions are related via a hierarchy, a user can leverage this relationship to substitute the concrete derived class for the abstract super-class and create view where only the types of the concrete class exist.

Figure 6:
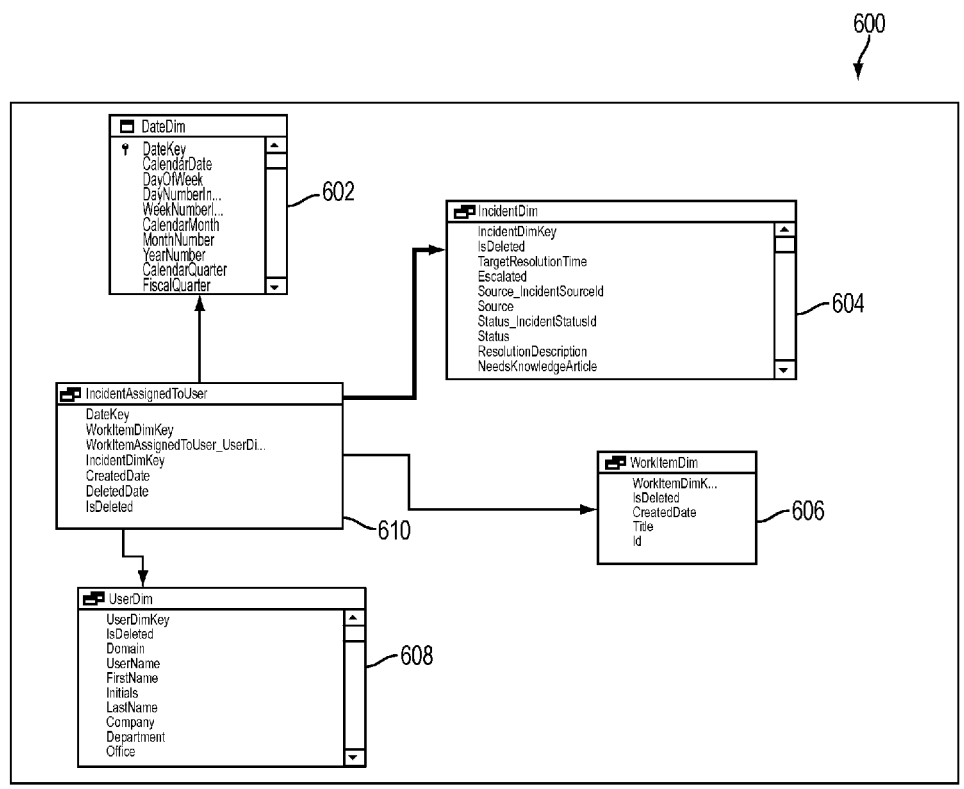
FIG. 6 is an exemplary data source view diagram according to an embodiment of the present disclosure.

The next step to be discussed in greater detail is: step 206. Continuing the example, the table IncidentAssignedToUser may be created with the appropriate foreign keys to all the associated dimensions. Referring now to FIG. 6, there is shown a data source view diagram 600 from Business Intelligence Development Studio (BIDS). One may see how there is a foreign key relationship between IncidentAssignedToUser 610 and the substitute dimension IncidentDim 604 as well as the original generic WorkItemDim 606. Table 3 illustrates the foreign key from the Source (measure group) table to the primary key in the Destination (Dimension) table portion.

TABLE 3

| Foreign Key | Primary Key | Dimension |
|---|---|---|
| WorkitemDimKey | WorkItemDimKey | WorkItemDim 606 |
| IncidentDimKey | IncidentDimKey | IncidentDim 604 |
| WorkItemAssignedToUser_UserDimKey | UserDimKey | UserDim 608 |

As indicated in Table 3, the foreign key (fk) WorkItemDimKey appears in primary key WorkItemDim 606 and in IncidentAssignedToUser 610. The other examples of Table 3 follow accordingly.

The next step to be discussed in greater detail is step 210. Once tables are created with all relationships similar to that shown above, the primary key of the substitute dimension may be explicitly added to the table's collection of columns in its metadata. This task may be accomplished by the analysis management objects (AMO) application programming interface (API). The AMO API permits a user to programmatically access, modify and create objects on the analysis services database (ASDB). Without this step, although a user can see the column in the DSV diagram, it may not be visible to the MAS cube or dimensions in analysis services (AS). The following lines of code in Table 4 illustrate at a high level how this is accomplished, explicitly adding a dimension primary key (pk) as a column to the data table.

TABLE 4

```
DataTable dataTable =
InitDataTableForNamedQuery(whDim.BaseDimension.Name);
dsv.Schema.Tables.Add(dataTable);
dataTable.Columns.Add(whDim.PrimaryKeyFromDimensionTable,
  typeof(int));
```

Figures 7, 9:
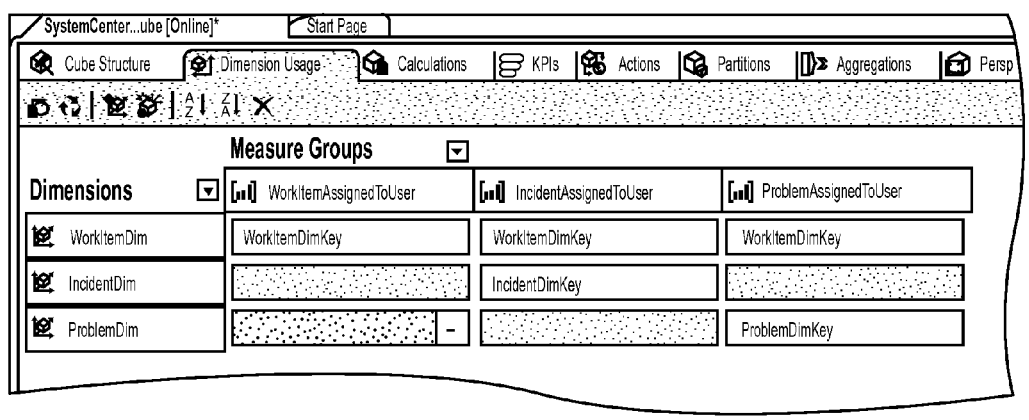
FIG. 7 is an exemplary diagram from Business Intelligence development studio (BIDS) according to an embodiment of the present disclosure.
FIG. 9 is a graphical user interface screen showing a Dimension Usage Tab in Business Intelligence Development Studio (BIDS) according to an embodiment of the present disclosure.

Referring now to FIG. 7, there is shown a diagram 700 from BIDS which shows the columns collection for the DataTable of the present example. The new Column IncidentDimKey is shown highlighted which is the primary key from the substituted dimension now included in the collection. Note the indication under Table as "sub" for substitute. Others may be indicated as "fact" under Table.

The next step that will be discussed in further detail is: generate a SQL query for the table in the DataSourceView which contains an inner join creating a logical link between the substituted dimension(s) and the original dimension. This final step links everything discussed thus far together by defining a named query which joins the fact targeted by the measure group, the original dimension and the substitute dimension(s). A table has now been created which only contains instances that apply to the substituted dimension, even though the targeted fact applies to a generic collection of instances.

Continuing the example, the automatically created query that joins all the relevant tables is shown in Table 5.

TABLE 5

```
SELECT  sub.IncidentDimKey,
  fact.WorkItemAssignedToUser_UserDimKey, fact.WorkItemDimKey,
  fact.CreatedDate, fact.DateKey, fact.DeletedDate,
    (CASE WHEN fact.DeletedDate IS NULL THEN 0 ELSE
    1 END) AS IsDeleted
FROM    dbo.IncidentDim AS sub INNER JOIN
    dbo.WorkItemDim AS orig ON sub.EntityDimKey =
    orig.EntityDimKey INNER JOIN
    dbo.WorkItemAssignedToUserFactvw AS fact ON
fact.WorkItemDimKey = orig.WorkItemDimKey
```

Figure 8:
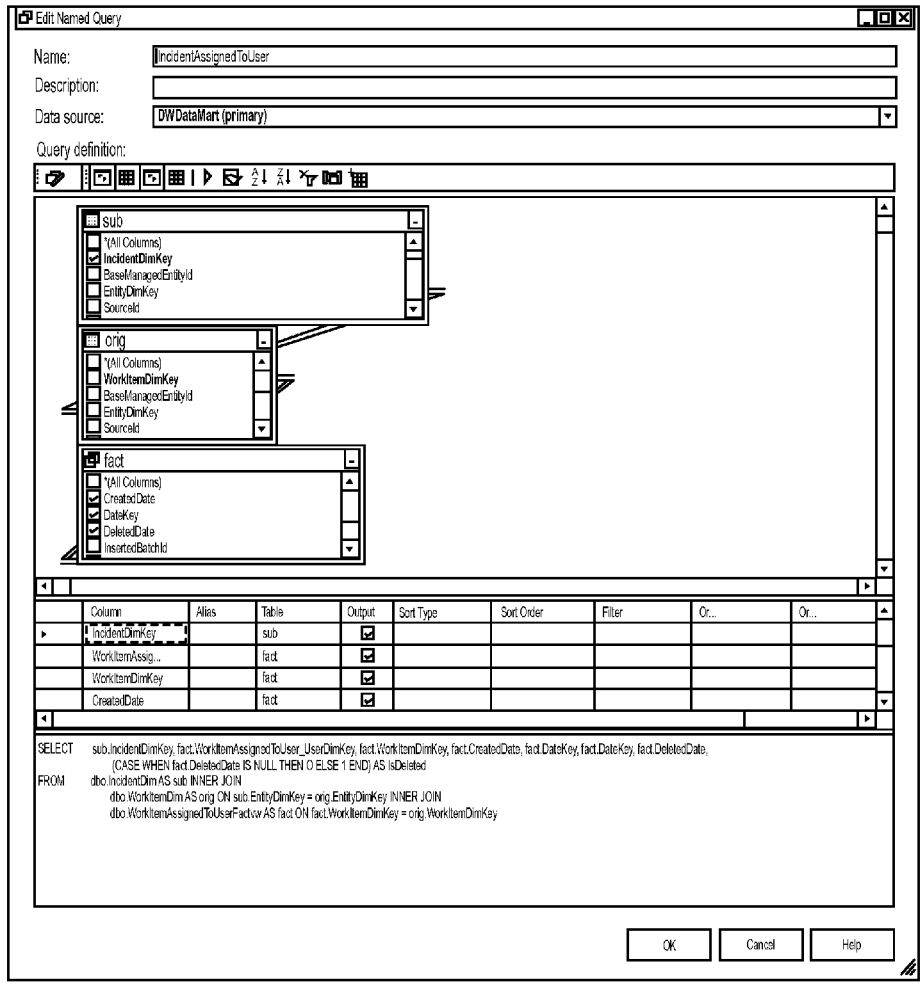
FIG. 8 is a graphical user interface screen showing the named query view that models a desired fact with a substituted dimension according to an embodiment of the present disclosure.

Referring to FIG. 8, there is shown an Edit Named Query screen for IncidentAssignedToUser according to an embodiment of the present disclosure. The diagram shows the named query view that models the indicated fact(s) with a substituted dimension where IncidentDimKey (substitute) and WorkItemDim (original) are indicated and linked to facts. The entire step, including the inner join, is done automatically "under the hood" by processor 104 without user intervention based on the definition that was provided in the xml.

Referring to FIG. 9, there is shown an exemplary Dimension Usage Tab screen from BIDS wherein MeasureGroups are shown horizontally and dimensions listed vertically according to an embodiment of the present disclosure. In this above example, one may see how the generic WorkItemAssignedToUser Measure Group only had WorkItemDim as a reference dimension. For the IncidentAssignedToUser and ProblemAssignedToUser measure groups, however, one can see how dimension substitution now allows the use of IncidentDim and ProblemDim respectively to filter against those measure groups in the WorkItemDim dimension.

In addition, building dimensions substitutions on top of a model-based data warehouse obviates the need for a user to have granular knowledge of the schemas in the underlying configuration manager databases (CMDB) because the model abstracts this knowledge away. The user also would not have to create various cube objects or structures so the user can use the substituted dimension to browse the cube.

Referring now to FIG. 10, there is shown an exemplary management pack with the name "Configuration Management Cube MP" where under warehouse is shown the cube identifier "SystemCenterWorkItemsCube." Then, "MeasureGroups" are listed (not shown) followed by "Substitutions." Under Substitutions for Incident, are the substitutions shown in Table 6.

TABLE 6

```
<Substitution MeasureGroupName="IncidentResolutionByUser"
TargetDimension="IncidentDW!IncidentDim" AliasTargetDimensionAs="IncidentDim"
Relationship="WorkItem!System.WorkItem.TroubleTicketResolvedByUser"
RelationshipEndPoint="Source" />
<Substitution MeasureGroupName="IncidentIsAboutConfigItem"
TargetDimension="DWBase!WorkItemDim" ReplacementDimension="IncidentDW!IncidentDim"
Relationship="WorkItem!System.WorkItemAboutConfigItem" RelationshipEndPoint="Source" />
  <Substitution MeasureGroupName="IncidentIsAboutConfigItem"
TargetDimension="DWBase!ConfigItemDim" AliasTargetDimensionAs="RelatedConfigItemDim"
Relationship="WorkItem!System.WorkItemAboutConfigItem"
RelationshipEndPoint="Target" />
```

In effect, a user is taking the WorkItemAboutConfigItem relationship and substituting WorkItemDim with IncidentDim, thus filtering the relationship to use only a specific sub-type of workitem which is germane to the user's interest.

In other words, a user in this example and according to an embodiment of the disclosure will no longer have to manually perform the following five steps to enable dimension substitution as explained below.

Step (1)—Define a view in DataSourceView in SQL which creates an inner join between the fact table and the original and substitute dimension:

As detailed above, a sample SQL query that would be automatically created requiring no additional user input other than what is provided in the Management Pack XML is shown in Table 7.

TABLE 7

SELECT sub.IncidentDimKey,
fact.WorkItemAssignedToUser_UserDimKey, fact.WorkItemDimKey,
fact.CreatedDate, fact.DateKey, fact.DeletedDate,
    (CASE WHEN fact.DeletedDate IS NULL THEN 0 ELSE
    1 END) AS IsDeleted TABLE 7-continued FROM    dbo.IncidentDim AS sub INNER JOIN
        dbo.WorkItemDim AS orig ON sub.EntityDimKey =
        orig.EntityDimKey INNER JOIN
        dbo.WorkItemAssignedToUserFactvw    AS
fact    ON    fact.WorkItemDimKey    = orig.WorkItemDimKey For example, in the SQL example of Table 7, the user would not have to know that the column EntityDimKey or WorkItemDimKey would be used as the columns to perform an inner join. These technical details that are specific to SCSM 2012 would be abstracted away.

The EntityDimKey integer columns allow a user to relate separate dimensions to each other in the same hierarchy via a model-based approach. For example, an Incident (which is also a workitem and derives from that class) would have the same EntityDimKey in both the WorkItemDim and IncidentDim. This metadata is important, determines relationships and derivations in a dimension model and is the key cog in enabling the use of dimension substitutions in OLAP or MAS cubes.

The XMLA (XML for Analysis) that SCSM 2012 may automatically create for the view is listed in Table 8.

TABLE 8

<xs:element name="IncidentAssignedToUser" msdata:Locale="" msprop:QueryDefinition="select
sub.IncidentDimKey, fact.WorkItemAssignedToUser_UserDimKey, fact.[WorkItemDimKey],
fact.[CreatedDate], fact.[DateKey], fact.[DeletedDate], (CASE WHEN fact.DeletedDate IS NULL THEN 0
ELSE 1 END) AS [IsDeleted]

    from dbo.IncidentDim sub
    join
dbo.WorkItemDim orig

    on (sub.EntityDimKey = orig.EntityDimKey)

join
dbo.WorkItemAssignedToUserFactvw fact
    on (fact.WorkItemDimKey =
orig.WorkItemDimKey)" msprop:TableType="View" msprop:IsLogical="True">
<xs:complexType>
<xs:sequence>
<xs:element name="DateKey" type="xs:int" minOccurs="0" />
<xs:element name="WorkItemDimKey" type="xs:int" minOccurs="0" />
<xs:element name="WorkItemAssignedToUser_UserDimKey" type="xs:int" minOccurs="0" />
<xs:element name="IncidentDimKey" type="xs:int" minOccurs="0" />
<xs:element name="CreatedDate" type="xs:dateTime" minOccurs="0" />
<xs:element name="DeletedDate" type="xs:dateTime" minOccurs="0" />
<xs:element name="IsDeleted" type="xs:int" minOccurs="0" />
</xs:sequence>
</xs:complexType>
</xs:element>

Step (2)—Create foreign key relationships from the fact view to the dimensions' view in the DSV:

In the example shown in FIG. 6, the foreign key relationships from IncidentAssignedToUser 610 to WorkItemDim 606 (the original dimension) and IncidentDim 604 (the substitution dimension) are automatically created. In addition to defining the SQL query for the view, the model-based OLAP framework also creates the cube structures that enable dimension substitution via the Analysis Management Objects (AMO) API. Otherwise, the user would either have to write the XMLA (shown below) or manually modify the cube using a designer tool such as BIDS. In Table 9, the XMLA that is automatically created by SCSM 2012 for these relationships is shown.

TABLE 9

```
<xs:keyref name="FK_IncidentAssignedToUser_IncidentDimKey" refer="IncidentDim_Constraint1">
<xs:selector xpath=".//IncidentAssignedToUser" />
<xs:field xpath="IncidentDimKey" />
</xs:keyref>
<xs:keyref name="FK_IncidentAssignedToUser_WorkItemDimKey" refer="WorkItemDim_Constraint1">
<xs:selector xpath=".//IncidentAssignedToUser" />
<xs:field xpath="WorkItemDimKey" />
</xs:keyref>
<xs:keyref name="FK_IncidentAssignedToUser_WorkItemAssignedToUser_UserDimKey"
refer="UserDim_Constraint1">
<xs:selector xpath=".//IncidentAssignedToUser" />
<xs:field xpath="WorkItemAssignedToUser_UserDimKey" />
</xs:keyref>
<xs:keyref name="FK_IncidentAssignedToUser_IsDeleted" refer="Constraint2">
<xs:selector xpath=".//IncidentAssignedToUser" />
<xs:field xpath="IsDeleted" />
</xs:keyref>
<xs:keyref name="FK_IncidentAssignedToUser_DateKey" refer="Constraint1">
<xs:selector xpath=".//IncidentAssignedToUser" />
<xs:field xpath="DateKey" />
</xs:keyref>
```

Step (3)—Add the dimensions to the list of Analysis Services dimensions in the Analysis Services Database (ASDB):

Once the dimensions views are created in the DSV, they may be visible to the ASDB, but they still need to be created and added to the MAS cube as an AS dimension object. Both the original and substitution dimension may be added to the list of dimensions in the ASDB if they are missing. A file, IncidentDimDefinition.xmla, may be created in XMLA to add the IncidentDim to the list of dimensions that is generated automatically in an embodiment of the present disclosure. The creation of the dimension involves performing the following steps which are all automated in SCSM 2012: Setting the source DataSourceView; Setting the Storage mode; and Creating all the attributes, key columns, attribute usage type, name columns, hierarchy enabled flags and other attribute related settings.

Step (4)—Add the measure group for this fact and role playing cube dimensions so users can browse the measure group within the cube using either the original or substitution dimension:

A file, IncidentAssignedToUserMeasureGroup.xmla may be created in XMLA to define the fact measure group. The creation of the measure group involves performing the following steps which may all be automated in SCSM 2012: Determining if the fact is a factless (i.e., relationship) fact or a custom fact; Setting the IgnoreUnrelatedDimensions flag; Adding the regular measure group dimensions; Adding the reference measure group dimensions for outriggers; Adding the many-to-many measure group dimensions; Adding the default aggregation design; Adding the partitions and their source queries delimited by datekeys; and Adding the measures.

Step (5)—Create measure groups for the original and substitution dimension as well as the associated many-to-many dimensions to enable a richer browsing experience:

A file, IncidentDimMeasureGroup.xmla may be created in XMLA to define the dimension measure group. In addition to creating the measure group for the fact, a user may also create a measure group for the dimensions targeted by the facts. This enables the user to create custom measures on numeric dimension properties via Management Pack Cube Extensions described in the '140 Application. A many-to-many dimension is creating using the parent fact as the intermediate measure group, which enables deeper and more complex browsing scenarios for the end user. The creation of the measure group for dimensions involves performing the following steps which may all be automated in SCSM 2012: Setting the IgnoreUnrelatedDimensions flag; Adding regular measure group dimensions; Adding the many-to-many measure group dimension to the parent fact; Addition of a single partition; and Adding the default and custom measures defined via the custom measure cube element in the Cube or CubeExtension definition.

While various aspects of the present disclosure have been described above, it should be understood that they have been presented by way of example and not limitation. It will be apparent to persons skilled in the relevant art(s) that various changes in form and detail can be made therein without departing from the spirit and scope of the present disclosure. Thus, the present disclosure should not be limited by any of the above described exemplary aspects, but should be defined only in accordance with the following claims and their equivalents.

In addition, it should be understood that the figures in the attachments, which highlight the structure, methodology, functionality and advantages of the present disclosure, are presented for example purposes only. The present disclosure is sufficiently flexible and configurable, such that it may be implemented in ways other than that shown in the accompanying figures.

Further, the purpose of the foregoing Abstract is to enable the U.S. Patent and Trademark Office and the public generally and especially the scientists, engineers and practitioners in the relevant art(s) who are not familiar with patent or legal terms or phraseology, to determine quickly from a cursory inspection the nature and essence of this technical disclosure.

The Abstract is not intended to be limiting as to the scope of the present disclosure in any way.

What is claimed is:

1. A computer-implemented method implemented at least in part on a programmed processor and memory, the method comprising:
   declaring, with the processor, a complex definition of a multidimensional analysis services cube, the multidimensional analysis services cube comprising a model stored in processor memory, the model comprising metadata determinative of a relationship between an original dimension of the multidimensional analysis services cube and a substitute dimension for the multidimensional analysis services cube;
   finding a substitution for a measure group for the multidimensional analysis services cube, the substitution involving the original dimension and the substitute dimension;
   creating a table in a data source view for the measure group;
   adding a property to the data source view comprising a primary key to the substitute dimension; and
   generating a query for the table comprising an inner join between the substitute dimension and the original dimension via the metadata of the model, the inner join logically linking the original dimension and the substitute dimension.

2. The computer-implemented method of claim 1, wherein:
   finding the substitution comprises finding relevant substitutions for the measure group of a management pack file during deployment of the management pack; and
   creating the table is implemented using an analysis management object application programming interface.

3. The computer-implemented method of claim 2, wherein finding relevant substitutions and a substitute dimension comprises:
   identifying an abstract dimension for a work item and a concrete dimension for an incident.

4. The computer-implemented method of claim 1, wherein adding a property to the data source view comprises:
   adding a column for a dimension primary key to the table of the data source view.

5. The computer-implemented method of claim 1, wherein generating the query comprises:
   generating a sequential query language query joining a dimension table and a fact table.

6. The computer-implemented method of claim 1, wherein the metadata comprises a dimension primary key of both the original dimension and the substitute dimension.

7. The computer-implemented method of claim 1, wherein the relationship is a hierarchal relationship in which the original and substitute dimensions share a dimension key.

8. The computer-implemented method of claim 1, further comprising:
   (e) automatically creating a foreign key relationship between a fact table and a dimension table.

9. A computer-implemented method implemented at least in part on a programmed processor and memory, the processor declaring a complex definition of a multidimensional analysis services cube, the cube comprising a model stored in processor memory, the method comprising the steps of:
   (a) finding relevant substitutions for an associated measure group of a management pack file during deployment of a management pack;
   (b) creating a table in a data source view for a measure group of the management pack using an analysis management object application programming interface;
   (c) adding a property to the data source view comprising a primary key to a substitute dimension for the multidimensional analysis services cube; and
   (d) generating a query for the table in the data source view, the query comprising an inner join between the substitute dimension and an original dimension of the multidimensional analysis services cube, the inner join logically linking the original dimension and the substitute dimension.

10. The computer-implemented method of claim 9, wherein finding relevant substitutions and a substitute dimension comprises:
    identifying an abstract dimension for a work item and a concrete dimension for an incident.

11. The computer-implemented method of claim 9, wherein adding a property to the data source view comprises:
    adding a column for a dimension primary key to the table of the data source view.

12. The computer-implemented method of claim 9, wherein generating the query comprises:
    generating a sequential query language query joining a dimension table and a fact table.

13. The computer-implemented method of claim 11, wherein the primary key is shared by the original dimension and the substitute dimension.

14. The computer-implemented method of claim 9, wherein the model comprises metadata determinative of a hierarchal relationship in which the original and substitute dimensions share a dimension key.

15. The computer-implemented method of claim 9, further comprising the step of:
    (e) automatically creating a foreign key relationship between a fact table and a dimension table.

16. The computer-implemented method of claim 9, further comprising:
    (e) querying the multidimensional analysis services cube using a substitute dimension via a business intelligence system.

17. A system comprising a processor and a computer usable storage medium having control logic stored therein including a framework for causing a processor to automatically generate a complex definition of a multidimensional analysis services cube, the cube comprising a model stored in processor memory, the control logic comprising:
    first computer readable program code for finding relevant substitutions for an associated measure group of a management pack file during deployment a management pack;
    second computer readable program code for creating a table in a data source view for a measure group of the management pack using an analysis management object application programming interface;
    third computer readable program code for adding a property to the data source view comprising a primary key to a substitute dimension for the multidimensional analysis services cube; and
    fourth computer readable program code for generating a query for the table in the data source view, the query comprising an inner join between the substitute dimension and an original dimension of the multidimensional analysis services cube, the inner join logically linking the original dimension and the substitute dimension.

18. The system of claim 17, further comprising:
    fifth computer readable program code for automatically creating a foreign key relationship between a fact table and a dimension table.

19. The system of claim 17, wherein the first computer readable program code further comprises further code for identifying an abstract dimension for a work item and a concrete dimension for an incident.

* * * * *